(12) United States Patent
Dong et al.

(10) Patent No.: US 6,474,971 B1
(45) Date of Patent: Nov. 5, 2002

(54) COMPOUNDING HEAT CURED RUBBER COMPOSITIONS

(75) Inventors: Stephen Dong, Clifton Park, NY (US); Devesh Mathur, Troy, NY (US); Robert Dean, Rexford, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/644,877

(22) Filed: Aug. 23, 2000

(51) Int. Cl.⁷ .................. B28B 17/00; B29C 35/02; B29C 47/92
(52) U.S. Cl. ............... 425/148; 425/140; 425/147
(58) Field of Search .................. 425/140, 147, 425/148, 169, 204, 205, 208; 244/142, 211.23, 143, 210.6; 366/98; 524/588

(56) References Cited

U.S. PATENT DOCUMENTS

| | | | |
|---|---|---|---|
| 3,414,540 A | * 12/1968 | Nugent et al. | 524/588 |
| 3,960,225 A | 6/1976 | Hyer et al. | |
| 4,300,841 A | * 11/1981 | Richards | 366/98 |
| 4,898,898 A | * 2/1990 | Fitzgerald et al. | 524/588 |
| 5,025,222 A | * 6/1991 | Scott et al. | 324/639 |
| 5,198,171 A | 3/1993 | Kasahara et al. | |
| 5,409,978 A | 4/1995 | Hamada et al. | |
| 5,439,623 A | * 8/1995 | Fintel | 264/349 |

FOREIGN PATENT DOCUMENTS

| | | |
|---|---|---|
| DE | 3303766 | 8/1984 |
| EP | 0945171 | 9/1999 |
| EP | 0958855 | 11/1999 |
| JP | 55003006 | 1/1980 |
| WO | 00 67976 | 11/2000 |

OTHER PUBLICATIONS

Plastics Processing—ed—Walter Michaeli 75–85, 127–137 (1992).*
Polymer– Mixing Technology—ed. George Matthews 191–221 (1982).*

* cited by examiner

*Primary Examiner*—Peter Szekely
(74) *Attorney, Agent, or Firm*—Philip D. Freedman; Kenneth S. Wheelock

(57) ABSTRACT

Filler, processing fluid and silicone polymer are controllably compounded into homogeneous filled heat cured rubber compositions with requisite reinforcing properties and levels of volatiles. In the process, a continuous feed of a silicone polymer to a compounding apparatus is monitored and a signal is generated in accordance with the monitored rate of feed. Rate of feed of filler and additives to the compounding apparatus are then adjusted in accordance with the signal.

19 Claims, 1 Drawing Sheet

COMPOUNDING HEAT CURED RUBBER COMPOSITIONS

BACKGROUND OF THE INVENTION

The invention relates to a process for preparing heat cured rubber (HCR) compositions.

An HCR composition comprises a high viscosity silicone polymer, an inorganic filler and various additives that aid processing or impart desired final properties to the composition. A vulcanizing agent or catalyst can be added and the composition heat cured to fabricate silicone rubber moldings such as gaskets, medical tubing and computer keypads.

Typically, the HCR composition is produced by kneading a high-viscosity polydiorganosiloxane, the inorganic filler and additives by means of a batch kneading machine such as a high intensity Banbury mixer or a low intensity double arm dough mixer. In this process, polydiorganosiloxane, inorganic filler, treating agents and additives are batch mixed until desired properties are obtained. In Kasahara et al., U.S. Pat. No. 5,198,171, a preconcentrate of polydiorganosiloxane, inorganic filler and treating agents is formed by a high speed mechanical shearing mixer. The resulting premix is further compounded in a same-direction double screw extruder. The premix is formed in a first step wherein a diorganopolysiloxane having a viscosity at 25° C. of $1 \times 10^5$ cP or more, an inorganic filler and a treating agent are mixed in a high speed mechanical shearing machine to provide a flowable particulate mixture in which each ingredient is present in a substantially uniform, finely dispersed state. The flowable particulate mixture is then fed at a constant feed rate into a kneading and extruding machine that has two screws rotating in the same direction.

A batch process requires long mixing times and large amounts of energy. Non-homogeneous shear and extensional stresses across a commercial sized batch can result in non-uniform size distribution of filler that results in variations in properties. Batches processed at different times may be characterized by different physical properties. The batch process is labor, energy and capital intensive and produces materials of only marginal consistency.

In Hamada et al., U.S. Pat. No. 5,409,978, a preconcentrate of polydiorganosiloxane, inorganic filler and treating agents is formed at a temperature in the range of about 200° C. to 300° C. in a co-rotating continuous double screw extruder. The preconcentrate is then compounded and heat treated at 150° C. to 300° C. in a counter-rotating, double screw extruder.

In a batch process, the silicone polymer, filler and treating agents can be accurately measured and charged into a mixer. However in a process such as the Hamada et al. process, polymer, filler and treating agent must be continuously fed as streams to the compounding apparatus. Control of continuously fed streams of materials is difficult but very important since component variations result in property variations in the compounded finished product. There is a need for a continuous process that can be controlled to provide products with consistent properties.

SUMMARY OF THE INVENTION

The invention provides a process that controllably compounds filler, processing fluid and silicone polymer into homogeneous filled HCR compositions with requisite reinforcing properties and levels of volatiles. The process comprises monitoring a continuous feed of a silicone polymer to a compounding apparatus and generating a signal in accordance with the monitored rate of feed. Rate of feed of filler and additives to the compounding apparatus are then adjusted in accordance with the signal.

In an embodiment of the invention, a silicone polymer is fed by means of a weighing belt to a compounding apparatus. The silicone polymer is compounded in the apparatus with filler and additives to form an HCR composition.

In another embodiment, compounding of an HCR composition is controlled by steps of separately sensing each of a rate of feed of silicone polymer, rate of feed of filler and rate of feed of additive to a compounding apparatus. Each of the sensed rates of feed is compared to a model of rates of feed for compounding a target HCR composition and at least one of the rates of feed is adjusted according to the comparing step.

In still another embodiment, an apparatus for compounding an HCR composition comprises a controllable silicone polymer feeder and controllable filler feeder, a signal generator associated with each of the silicone polymer feeder and the filler feeder to produce a signal proportionate to a feed rate of polymer and a signal proportionate to a feed rate of filler and a controller to receive the signals, to compare the signals to a model of feed rates and to emit a signal to adjust the feed rate of polymer, filler or both according to the comparison.

DETAILED DESCRIPTION OF THE INVENTION

Figure 1:
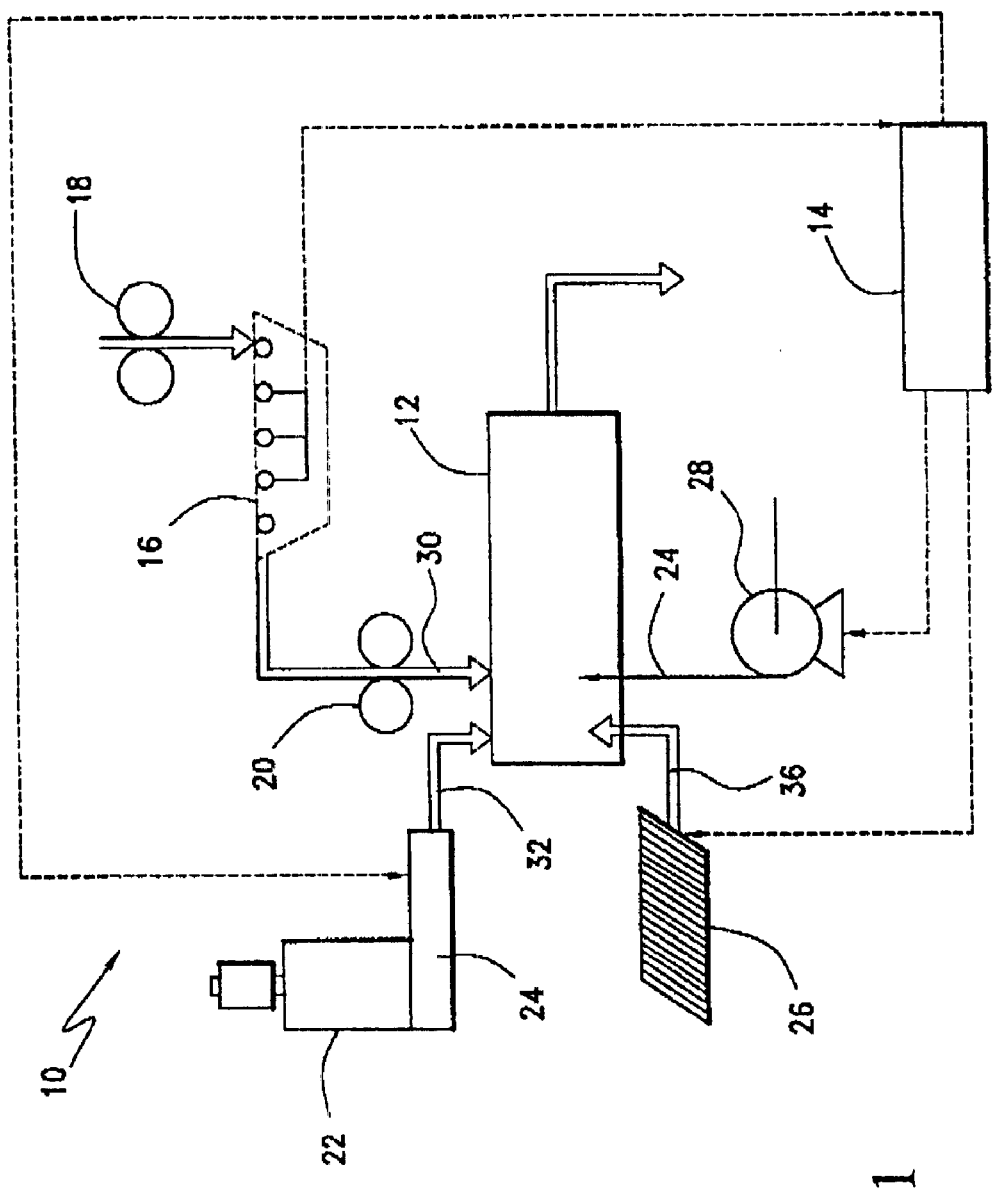
FIG. 1 is a schematic representation of a controlled HCR composition compounding process and apparatus.

According to the invention, an HCR composition can be formed with consistent properties. Additionally, the process can be used to produce a variety of products. Process and apparatus are provided by the invention to controllably produce a free-flowing particulate concentrate of silicone and filler in a first high feed mixing stage. The concentrate can be continuously discharged from the mixing stage to a compounding apparatus for further processing. Additionally, a process and apparatus can be provided according to the invention to control a continuous process in a unitary continuous compounding apparatus for compounding HCR compositions.

In an embodiment of the invention, feeds of base polymer, filler and treating agents are advantageously adjusted to provide customized products. "Base polymer" is a polydiorganosiloxane that has been compounded with at least about 20 parts filler per 100 parts polydiorganosiloxane into the form of a particulate or strip of polymer. Base polymer can also include treating agents, coloring agents or processing aids or the like. The base polymer is characterized by a Shore A Hardness of at least 30.

The filler that can be used in the invention can be any inorganic filler used in blends with silicone polymers. Examples of inorganic fillers include a reinforcing silica such as fumed silica or precipitated silica or a silica that has been surface-treated with an organosilicon compound such as an organopolysiloxane, organoalkoxysilane, organochlorosilane or a hexaorganodisilazane. The filler can be diatomaceous earth, finely crushed quartz, aluminum oxide, titanium oxide, iron oxide, cerium oxide, cerium hydroxide, magnesium oxide, zinc oxide, calcium carbonate, zirconium silicate, carbon black or ultramarine. A single filler or a combination of fillers can be used to reinforce the silicone polymer.

The amount of the filler in the HCR can be in the range of from about 30 to about 300 parts by weight, desirably from about 70 to about 230 parts by weight and preferably from about 100 to about 200 parts by weight, per 100 parts by weight of silicone polymer.

The silicone polymer used in the compositions of the present invention can be represented by recurring units of Formula I:

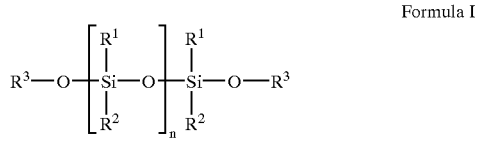

Formula I wherein, $R^1$ independently at each occurrence represents $C_{1-4}$ alkyl, or $C_{2-4}$ alkylene; $R^2$ independently at each occurrence represents $C_{1-4}$ alkyl, $C_1$–$C_4$ haloalkyl or $C_{2-4}$ alkylene; $R^3$ independently at each occurrence represents H, $C_{1-10}$ alkyl, $C_{2-4}$ alkylene, $C_{4-6}$ cycloalkyl, OH or $C_1$–$C_4$ haloalkyl; and n represents an integer from 1,000 to 20,000.

A further preferred composition comprises a silicone polymer wherein, $R^1$ independently at each occurrence represents, $CH_3$ or $CH=CH_2$; $R^2$ independently at each occurrence represents, $CH_3$, $CH=CH_2$ or $CH_2CH_2CF_3$; $R^3$ independently at each occurrence represents $CH_3$, $CH=CH_2$, OH or $CH_2CH_2CF_3$; and n represents an integer from about 4,000 to about 10,000.

Another embodiment provides a composition wherein the vinyl content of the silicone polymer ranges from about 0.05% to about 0.5% by weight of the silicone polymer.

The HCR composition can also include other additives such as heatresistance improvers such as oxides, hydroxides and fatty acid salts of metals, vulcanization reverse inhibitors, catalysts, flame retardants such as platinum compounds, discoloration preventive agents, plasticizers such as silicone oil, hydride, antibloom agent, mold release agent heat stabilizer, internal release agent such as metal soaps, pigments and dyes.

Features of the invention will become apparent from the following drawings and detailed discussion, which by way of example without limitation describe embodiments of the present invention.

FIG. 1 is a schematic representation of a controlled HCR compounding process and apparatus. In FIG. 1, processing apparatus shown generally as 10 includes extruder 12 and controller 14. A feed of base silicone polymer in a strip form is fed onto weighing belt 16 through nip roller 18 and from weighing belt 16 through nip roller 20.

Hyer et al., U.S. Pat. No. 3,960,225 illustrates a typical weighing belt that can be used in the present invention. The weighing belt 16 is a conveyer type that includes a belt and a drive means. The belt includes a first weight signal generator associated with a position of a portion of the belt at a first reference point, a second weight signal generator associated with a position of the belt at a second reference point and a position compensator operative in step with travel of the belt as signaled by the two reference points.

In FIG. 1, the belt 16 is operatively connected to controller 14, which receives signals from the belt 16 that represent belt travel and feed rate of base polymer and compares the signals to a model of belt travel and feed rate. The controller 14 emits signals to a position compensator to adjust belt travel and/or material flow—both filler and additives—accordingly.

The feed base polymer can be any silicone polymer that is hard and stable enough to have dimensional stability so as not to flow from the weighing belt 16. The weighing belt 16 can be teflon coated and can be combined with a scraper to remove any residual polymer.

The processing apparatus 10 further includes hopper 22, which holds filler for charging into extruder 12 via feeder 24, paste pump 26, which charges additives in the form of paste and liquid pump 28, which charges liquid additives. Each of hopper 22, feeder 24, pump 26 and 28 includes and represents a rate sensor and signal generator.

A process of the invention can be described with reference to FIG. 1. In the process a rate of silicone polymer feed 30 is sensed and the sensed feed rate is compared by controller 14 to a model of a rate of feed for compounding a HCR composition comprising a target proportion of polymer, filler and additive, either liquid or paste. At the same time, feed rates of filler 32, paste additives 34 and liquid additives 36 are sensed and compared to the model. The controller 14 can be a microprocessor or computer or the like. For each case of polymer, filler and additive, feed rate is compared to the model and the controller 14 emits an adjustment signal to weighing belt 16, feeder 24, pump 26 and/or pump 28 to accordingly adjust feed of polymer 30, filler 32, paste additive 34 and/or liquid additive 36 for compounding in extruder 12 to target composition product 38.

These and other features will become apparent from the following detailed discussion, which by way of example without limitation describes preferred embodiments of the present invention.

EXAMPLES

An equipment set up is provided that includes a K-Tron K-10S weighing belt and feeder system control, a 5 inch Readco co-rotating, twin screw extruder and loss-in-weight feeders. The K-Tron system is a vibrating wire weighing technology-based belt feeder with an on-board microprocessor. Base polymer is fed to the extruder in a strip form by means of the K-Tron belt. The loss-in-weight feeders are slaved to the microprocessor of the K-Tron. The K-Tron belt monitors rate of feed of the base polymer strip to the extruder to generate a signal, which controls the loss-in-weight feeders so that the feeders provide feed of filler and additives to the extruder to provide controlled proportions of feed materials.

The set-up is illustrated in FIG. 1, wherein master feed of polymer on weighing belt 16 is slaved by an interlock so that if the feed falls below a pre-programmed target, it shuts off. This set-up permits a constant feed of base polymer from a storage source or directly and continuously from an up-stream base polymer compounding process. The feed interlock also includes rollers 18 and 20 so that a smooth charge of base polymer strip is fed to both the weighing belt 16 and from the weighing belt to extruder 12. Filler and additive feeds, 32 and 36, are slaved to the base polymer feed via the weighing belt 16 so that base polymer feed deviation will shut down both filler and additive feeds, 32 and 36. Additionally, the weighing belt 16 is reciprocably controlled by filler and additive feeds 32 and 36 to shut down if filler feed or additive feed falls below a set level for a finite time period.

A base polymer (Shore A Hardness of 42) strip, 1 inch thick and 5 inches wide is fed over the weighing belt into the extruder at a target rate of 400 parts per hour. The base polymer comprises a pre-compounded composition of 100 parts polydiorganosiloxane, 28.6 parts fumed silica, 6 parts silanol-stopped silicone additive, 12 parts HMDZ, 1 part distilled water and 200 parts of 10 micrometer quartz. In a first set of runs, a final composition is compounded comprising 39.19% base polymer, 59.69% Minusil (quartz), 0.12% silanol-stopped silicone additive and 0.4% magnesium oxide paste additive. A transfer function is developed for the relationship between base polymer and Minusil. Feed of the base polymer and feed of the Minusil are controlled by the set-up according to the transfer function to produce the final composition. Samples are taken every 10 minutes and further compounded with 15 parts of catalyst and the samples cured for 12 minutes at 200° C. Specific gravity of each cured sample is determined to track input control capabilities of the set-up.

Specific Gravity results of the samples are provided in Table 1.

TABLE 1

| Sample/Property | Specific (Gravity |
|---|---|
| 1 | 1.674229 |
| 2 | 1.666119 |
| 3 | 1.676551 |
| 4 | 1.651667 |
| 5 | 1.6889 |
| 6 | 1.689229 |
| 7 | 1.675889 |
| 8 | 1.672002 |
| 9 | 1.669443 |
| 10 | 1.666551 |
| 11 | 1.679776 |
| 12 | 1.681995 |
| 13 | 1.665997 |
| 14 | 1.682334 |
| 15 | 1.682668 |
| 16 | 1.67221 |
| 17 | 1.693667 |
| 18 | 1.665552 |
| 19 | 1.683888 |
| 20 | 1.660007 |

Specific Gravity standard deviation for the products in Table 1 is ±0.0106. FIG. 2 is a histogram of the runs. Polymer feed composition varies no more than 2% Minusil feed no more than 3%. The Table 1 results and the FIG. 2 histogram shows that a standard controlled final product can be prepared from base polymer according to the invention. The invention can be used to provide a high quality product with high control on performance parameters.

While preferred embodiments of the invention have been described, the present invention is capable of variation and modification and therefore should not be limited to the precise details of the Examples. The invention includes changes and alterations that fall within the purview of the following claims.

What is claimed:

1. A process of compounding an heat cured rubber composition, comprising:
    monitoring a continuous strip form feed of a silicone polymer directly to a compounding apparatus;
    generating a signal in accordance with said monitored rate of feed; and
    adjusting a rate of feed of filler or additive to said compounding apparatus in accordance with said signal.

2. The process of claim 1, further comprising compounding said silicone polymer with said adjusted rate of feed of filler or additive to form said heat cured rubber composition in said apparatus.

3. The process of claim 1, comprising adjusting a rate of feed of filler to about 30 to about 300 parts by weight to 100 parts by weight of silicone polymer.

4. The process of claim 1, comprising adjusting a rate of feed of filler to about 70 to about 230 parts by weight to 100 parts by weight of silicone polymer.

5. The process of claim 1, comprising adjusting a rate of feed of filler to about 100 to about 200 parts by weight to 100 parts by weight of silicone polymer.

6. The process of claim 1, comprising adjusting a rate of feed of additive to about 0.1 to about 100 parts additive by weight to 100 parts of filler.

7. The process of claim 1, comprising adjusting a rate of feed of additive to about 0.5 to about 75 parts by weight additive to 100 parts of filler.

8. The process of claim 1, comprising adjusting a rate of feed of additive to about 1.0 to about 50 parts by weight additive to 100 parts of filler.

9. The process of claim 1, wherein said signal is compared to a model of a feed rate for compounding a target proportion of polymer, filler or additive and a second signal is generated in accordance with said comparing step to adjust said rate of feed of filler or additive.

10. The process of claim 9, wherein said signal is compared and said second signal is generated by a microprocessor.

11. A process of compounding an heat cured rubber composition, comprising:
    continuously feeding a silicone polymer in strip form by means of a weighing belt directly to a compounding apparatus; and
    compounding said silicone polymer with filler and additives in said apparatus to form said heat cured rubber composition.

12. The process of claim 11, comprising monitoring a rate of feed of said silicone polymer; and adjusting a feed rate of filler or additives to said compounding apparatus in accordance with said monitored rate of feed of said strip.

13. The process of claim 11, comprising monitoring a rate of feed of said silicone polymer; generating a signal in accordance with said monitored rate of feed; and adjusting a rate of speed of filler or additives to said compounding apparatus in accordance with said signal.

14. The process of claim 11, wherein said silicone polymer comprises base polymer.

15. The process of claim 11, wherein said silicone polymer comprises base polymer in a particulate or strip form.

16. A process of controlling compounding of a heat cured rubber composition, comprising steps of;
    separately sensing each of a rate of feed of silicone polymer, rate of feed of a filler and rate of feed of an additive to a compounding apparatus;
    comparing each of said sensed rates of feed to a model of rates of feed for compounding a target heat cured rubber composition; and
    adjusting at least one of said rates of feed according to said comparing step.

17. The process of claim 16, wherein said at least one of said rates of feed is adjusted to provide said target heat cured rubber composition.

18. The process of claim 16, wherein said silicone polymer comprises base polymer.

19. An apparatus for compounding an heat cured rubber composition, comprising:
    a controllable weighing belt silicone polymer feeder directly connected to an extruder and controllable filler feeder connected to the extruder;
    a signal generator associated with each of said silicone polymer feeder and said filler feeder to produce a signal proportionate to a feed rate of polymer and a signal proportionate to a feed rate of filler; and
    a controller to receive said signals, to compare said signals to a model of feed rates and to emit a signal to adjust said feed rate of polymer, filler or both according to said comparison.

* * * * *